United States Patent Office 3,253,928
Patented May 31, 1966

3,253,928
STORAGE-STABLE NON-FIRMING ICING AND SHORTENING UTILIZED THEREIN
William T. Bedenk and Robert D. Dobson, Greenhills, Ohio, assignors to The Procter & Gamble Company, Cincinnati, Ohio, a corporation of Ohio
No Drawing. Filed May 15, 1963, Ser. No. 280,731
11 Claims. (Cl. 99—139)

This invention relates to new and improved food products and, more particularly, to storage-stable non-firming icings and to shortenings which are particularly useful for the preparation of such icings.

Icings are coatings which can be applied to cakes, sweet rolls, pastries and other baked goods. Although the basic ingredients of icings, as is well known, are sugar and water, the properties and characteristics of icings can be modified by variation of the constituents and additives used in connection with the basic sugar and water.

Certain types of icings, generally known as cream or butter-cream icings, contain a substantial proportion of fat or shortening and can be whipped to incorporate an appreciable volume of air. Although such icings initially have an attractive appearance and structure, they frequently tend to be unstable over relatively short periods of time. That is, they are subject to excessive drying, firming, or hardening, and tend to bleed oil, slump or collapse.

Conventional cream icings also have been found to be deficient in their resistance to storage conditions during normal retail shelf-life. That is, they tend to lose desirable icing properties even when packaged in sealed containers. This instability has made it impractical to attempt to market in commercial channels a ready-to-use prepared cream icing.

An object of the present invention is the preparation of a storage-stable fat-containing icing having improved non-firming properties.

Another object is the preparation of a shortening which will impart stability to a packaged icing which will remain soft and spreadable over long periods of time without hardening.

Still another object is the preparation of a storage-stable packaged icing which is capable of retaining air in the form of finely distributed bubbles.

A further object is the preparation of a cream icing which is stable toward slump, bleeding of oil, and collapse while spread on a cake or other baked product.

A still further object is the preparation of a ready-to-use cream icing that is resistant to microbial spoilage for extended periods of storage time in sealed containers.

It has been discovered according to this invention that excellent non-firming and storage-stability of cream icings is obtained by incorporating therein a specially compounded shortening having certain definite properties. This finding is in distinct contrast to the approach of other technologists in the cream icing field who have been concerned primarily with the use of various minor additives of one sort or another rather than with the particular type or structure of the basic fat or shortening incorporated in the icing. Thus, most icing formulae of the fat-containing type call for the use of shortening or various other fatty materials with little or no attention being given to the chemical or physical structure of the fat required. The fats and shortenings usually suggested for icing preparation are butter, margarine, or the conventional partially hydrogenated fats and oils which are commercially sold for general purpose frying and baking.

As is well known in the art, the conventional partially hydrogenated shortenings have a dominant beta-prime crystalline phase as distinguished from an alpha or beta-phase. These types of polymorphic crystalline structures of fats can be identified by their X-ray diffraction patterns and are described in U.S. Patents 2,521,241–2, granted to Paul J. Mitchell, Jr., September 5, 1950. Many of the ordinary glyceride fats can be crystallized in one or more of these forms which generally depends upon the particular processing treatment to which they are subjected.

It has now been found that a substantially non-firming and non-hardening storage-stable icing comprising sugar, water, and shortening, can be prepared by employing in the icing a plastic shortening comprising essentially base stock of partially hydrogenated glyceride having admixed therein a substantial proportion of a substantially completely hydrogenated triglyceride hardstock having a predominant beta-phase crystalline structure. The base stock of the shortening has an iodine value of from about 50 to about 110 and the hardstock an iodine value not exceeding about 12. This storage-stable non-firming icing also is adaptable to the retention therein of an appreciable volume of air in a finely divided state during aging.

In the co-pending application of Bedenk, Brunner, and Goodrich, U.S. Serial No. 280,734, now U.S. Patent 3,194,666, filed concurrently herewith, it is disclosed that the aeration characteristics of an icing of the type described herein can be substantially improved by the employment of certain selected combinations of hardstocks in the shortening component of the icing.

As used herein, the term "plastic" shortening is meant to define a solid, non-fluid, non-pourable and non-pumpable shortening at room temperature (70° F. to 100° F.). Said shortening must have a yield point high enough to prevent product flow at room temperature, that is, it must not only be sufficiently solid to prevent product deformation under its own weight in ordinary commercial unit quantities, but also be non-pumpable with ordinary commercial pumps which are conventionally used for pumping liquids or fluids at room temperature. In order to satisfy these conditions, the shortening must have substantial interlacing of crystalline particles of very small size.

It is preferable to form the shortening so that it comprises essentially, by weight of the shortening, from about 55% to about 75% partially hydrogenated glyceride base stock having an iodine value of from about 50 to about 110 and from about 25% to about 45% substantially completely hydrogenated triglyceride hardstock having an iodine value not exceeding about 12, at least about 70% of the shortening solids being in a beta-phase.

The base stock of the shortening of this invention is a partially hydrogenated glyceride which can be derived from animal, vegetable, or marine sources including naturally-occurring triglyceride oils and fats such as cottonseed oil, soybean oil, peanut oil, olive oil, coconut oil, palm kernel oil, palm oil, corn oil, rapeseed oil, safflower oil, sesame seed oil, sunflower seed oil, sardine oil, lard, tallow and the like. A preferred base stock is partially hydrogenated soybean oil having an iodine value of from about 75 to about 95.

Other suitable base stock glycerides having the herein-defined iodine values for use in this invention can be derived from natural or synthetic fats and oils containing long-chain acyl groups in the glyceride molecule of from about 12 to about 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupadonoyl, lignoceroyl, and/or selacholeoyl. A portion of the base stock glycerides also can contain in the molecule one or two short-chain acyl groups having from 2 to about 6 carbon atoms such as acetyl, propanoyl, butanoyl, pentanoyl, and hexanoyl. Suitable base stock also can be derived from randomly and low temperature rearranged fatty triglyceride-containing oils and fats such as rearranged cottonseed oil and lard.

Suitable partial hydrogenation of liquid triglyceride oil to form the base stock of this invention can be carried out by conventional methods and usually consists of a batch process whereby the oil is contacted with hydrogen in the presence of a nickel catalyst. Various triglyceride fats and oils, such as lard, tallow, olive oil, and peanut oil, which normally have iodine values within the preferred range will require little or no additional hydrogenation.

The iodine value (I.V.) of an oil or fat indicates the number of grams of iodine equivalent to the halogen absorbed by a 100 gram sample. In general, the lower the iodine value of a given fat or oil, the greater will be its content of solids at a given temperature. That is, as the triglyceride molecules become more saturated by the addition of hydrogen (or the double bond content decreases), the consistency of the fat or oil becomes more solid. The iodine value can be readily determined by the well-known Wijs method.

A reasonably accurate approximation of the percent by weight of solids in a sample of fat or oil at any given temperature can be determined dilatometrically by a method described in 31 J. Am. Oil Chemists Society 98–103 (March 1954). The approximation of the solids content of the sample according to this method is stated in terms of a solids content index (S.C.I.). The above-described range of iodine values of from about 50 to about 110 for the partially hydrogenated glyceride base stock of this invention corresponds approximately to a range of solids content index of from about 0 to about 75 at 70° F.

The substantially completely hydrogenated triglyceride hardstock should have strong beta-forming tendencies such as tristearin, tripalmitin, and symmetrical palmitodistearin. Other suitable hardstocks having strong beta-forming tendencies can be derived from substantially completely hydrogenated fats and oils such as lard, sunflower seed oil, safflower seed oil, linseed oil, sesame seed oil, hazelnut oil, soybean oil, peanut oil, olive oil, and corn oil. A preferred hardstock component is substantially completely hydrogenated soybean oil having an iodine value of about 8.

The partially hydrogenated glyceride base stock and substantially completely hydrogenated triglyceride hardstock can be combined to form the plastic shortening of this invention by various means whereby the solid phase of said shortening is substantially in a beta-phase crystalline form of very small particle size. One method of forming a beta-phase plastic shortening is described in U.S. Patent 2,801,177, granted to Edwin S. Lutton, July 30, 1957. This method can be used in the practice of this invention provided that the herein-described proportions of base stock to hardstock are met and a higher tempering temperature is used, i.e., on the order of about 110° F. to about 120° F., in order to form a substantial interlacing of crystalline particles of very small size.

A preferred method of forming the beta-phase plastic shortening of this invention comprises forming a completely melted mixture of the base stock and hardstock in the above-described proportions. This can usually be accomplished by heating to a temperature in excess of about 150° F. The melted oil mixture then is pumped through a scraped wall heat exchanger in which the oil is rapidly chilled to a temperature of from about 70° to about 90° F. A suitable device for this purpose, referred to as a freezer or "Votator," is described in U.S. Reissue Patent No. 21,406, granted to Clarence W. Vogt, March 19, 1940. From this heat exchanger, the chilled supercooled mixture is pumped into containers where the shortening substantially completes its crystallization. Transformation of the shortening solids to beta-phase then takes place at rest in a tempering room which is held at a temperature of from about 110° to about 120° F. Within a period of about 12 hours after the shortening reaches 110° F., its crystalline structure is converted to predominantly beta-phase crystals (70% or greater). Shortening as prepared in the above manner will be plastic and have a substantial interlacing of crystalline particles of very small size.

The shortening prepared in the foregoing manner can be used to form an excellent storage-stable non-firming and non-hardening icing comprising sugar, water, and fat. Although this shortening is formed so that it is particularly adaptable to such storage-stable icings, it can also be used for other edible purposes, in which case one or more of the conventional shortening emulsifiers preferably are incorporated therein. For example, the ordinary mono- and diglycerides of the higher fatty acids, such as mono- and distearin and mono- and diolein, can be used as ingredients for ordinary emulsifying purposes in the shortening of this invention. It is preferable for icing purposes to include in the shortening from about 2.5% to about 5%, by weight, of a mixture of mono- and diglycerides of partially hydrogenated soybean oil having an iodine value of from about 75 to about 80.

Various other additives can be used in the shortening of this invention provided that they are edible and aesthetically desirable. It will be recognized, however, that the presence of other additives may have an adverse effect upon the stabilizing properties of the shortening of this invention and, therefore, the desirability of the use of other additives will depend upon the overall shortening and icing qualities desired. Certain common shortening and icing additives such as the higher fatty acid esters of sucrose, sorbitol, sorbitan, polyoxyethylene and polyoxyethylene sorbitan; lactic and/or citric acid esters of mono- and/or diglycerides or of other higher fatty acid-containing polyol partial esters; propylene glycol monostearate; and the like materials are compatible with the beta-phase shortening and the icing of this invention and can be incorporated therein if desired. In particular, from about 2% to about 6%, by weight of the shortening, of polyoxyethylene sorbitan monostearate has been found useful for improving the texture and sheet of the icing.

Other ingredients such as flavoring; coloring; conventional acidifying agents, such as citric, acetic, and phosphoric acids; sodium chloride and other salts; dextrose and other sugars; antioxidants, such as butylated hydroxytoluene, butylated hydroxyanisole, citric acid, and methyl silicone; and conventional mold inhibitors, such as sorbic acid, potassium sorbate, dehydroacetic acid, and sodium benzoate also can be added to the shortening or icing of this invention if desired.

It is preferable to use sorbic acid as a microbial inhibitor in the icing of this invention at a concentration ranging from about 0.05% to about 0.15%, by weight, and to adjust the pH of the icing to about 4.5 to 6.0 with a minor amount of an edible acid such as acetic, citric, or phosphoric acid. It has been found that such use of sorbic acid provides excellent stability against microbial spoilage of the packaged icing for periods in excess of 52 weeks when the sealed containers are stored at room temperature (70° F. to 100° F.) The use of sorbic acid, potassium sorbate, and sodium benzoate as inhibitors of growth of micro-organisms in sundry food products is described in U.S. Patent 2,379,294, granted to Chester M. Gooding, June 26, 1945. The use of sodium benzoate and citric acid in an icing is described in U.S. Patent 2,353,307, granted to Julian A. Joffe, July 11, 1944.

In preparing the icing of this invention it is preferable first to dissolve a small amount of hydrophilic colloid in water to form an aqueous stabilizer base and then add thereto the other icing ingredients, except shortening, to form a fondant. As used herein, the term "fondant" is meant to define a mixture of fine particles of sucrose in saturated sucrose syrup which can contain other ingredients of the icing except the shortening. The other ingredients generally include sugar, salt, and flavoring materials.

Suitable hydrophilic colloids are Irish moss and carragheen gum, locust bean gum, alginates, agaragar, gelatin, and water-soluble cellulose ethers such as sodium carboxymethyl cellulose, methyl cellulose, and the like. These colloidal materials assist the formation of a smooth dispersion of various other ingredients in the icing. They are preferably used in amounts of from about 0.05% to about 2% by weight of the icing. The other ingredients of the fondant, which consist primarily of sugar, salt, and flavoring materials, can be conveniently mixed into the aqueous component with a Hobart paddle-type mixer.

When the ingredients of the fondant are blended together, the plastic shortening component can be added and mixed in with a turbine agitator to form a homogeneous icing. During or after the latter mixing, it is also desirable to beat into the icing an appreciable volume of air, nitrogen, nitrous oxide, carbon dioxide, octafluorocyclobutane or other edible gas.

In order to form a smooth, soft, homogeneous icing with the shortening having the high hardstock content (25% to 45%), it is preferable to subject the shortening to intensive high shear mixing prior to its incorporation in the fondant. The high shear mixing mechanically breaks up the crystal matrix to give a fine structure in the shortening whereby it can be readily dispersed in the fondant to form a smooth, creamy icing. This can be accomplished by passing the shortening through a centrifugal pump or by means of hammermills, colloid mills, and other devices to impart high shear.

It is preferable to incorporate the basic sugar, water, and shortening in the icing formula in proportions as to satisfy the condition that the icing composition comprises, by weight, from about 45% to about 75% sugar, from about 10% to about 25% water, and from about 5% to about 30% shortening.

The following examples illustrate the shortening and icing compositions of this invention, but the invention is not limited to these specific examples.

*Example 1*

An icing was prepared from ingredients as follows:

| Ingredients: | Percent by weight |
|---|---|
| Water | 14.70 |
| Carragheen gum | 0.06 |
| Powdered sugar (sucrose) | 64.74 |
| Dextrose | 4.50 |
| Sodium chloride | 0.50 |
| Sorbic acid | 0.10 |
| 50% aqueous citric acid solution | 0.10 |
| Flavoring | 0.30 |
| Shortening | 15.00 |
| | 100.00 |

The carragheen gum was dispersed in the water at room temperature and the mixture was heated to about 145° F. to form an aqueous stabilizer base for the icing. A fondant was prepared by slowly adding to this mixture the remaining ingredients, except the shortening, and mixing with a Hobart paddle mixer until a smooth texture was obtained. A specially compounded plastic shortening was then blended into the fondant with a turbine agitator at a processing temperature of about 100° F. to form a smooth icing having an attractive sheen. The plastic shortening had the following composition:

| Ingredients: | Percent by weight |
|---|---|
| Base stock (refined, bleached soybean oil partially hydrogenated to an iodine value of about 85 and a solids content index of 11 at 70° F.) | 63 |
| Hardstock (substantially completely hydrogenated soybean oil having an iodine value of 8) | 30 |
| Mono- and diglycerides of partially hydrogenated soybean oil having an iodine value of about 80 | 4 |
| Polyoxyethylene sorbitan monostearate ("Tween 60") | 3 |

The shortening was formed by melting a mixture of the above ingredients by heating to a temperature slightly in excess of about 150° F. The melted oil mixture was pumped through a scraped wall heat exchanger ("Votator") in which the oil was rapidly chilled to a temperature of about 85° F. The chilled supercooled mixture which issued from the refrigerated heat exchanger was pumped into containers (50 pound size, polyethylene lined) and allowed to crystallize substantially completely. The containers with the substantially completely crystallized shortening were placed in a constant temperature room having a temperature of about 120° F. The shortening was kept in this room at this temperature at rest for a period of about 12 hours after it reached a temperature of 110° F., during which time the solid phase of the shortening was converted to predominantly beta-phase crystals (greater than 70%) as determined by X-ray diffraction patterns.

The icing of this example has excellent eating qualities and is stable toward slump and bleeding of oil when spread on a cake after being stored in sealed containers at atmospheric pressure for extended storage periods of six months. It remains soft and spreadable during such storage period and can be marketed as a packaged, ready-to-use prepared icing without refrigeration. It can also be aerated, if desired.

*Example 2*

Four icings were prepared according to the procedure of Example 1 except that the amount of hardstock in the shortening component was adjusted at the expense of the base stock and/or the type of hardstock used was changed as shown in the table below. These icings together with the icing of Example 1 were then aged at 100° F. for 40 days in sealed containers at atmospheric pressure. The viscosity of the icings before and after aging was determined with a Brookfield Synchro-electric Viscometer Model RVT ½ using the F spindle and a spindle speed of 5 r.p.m. The viscosity was measured after returning the icing samples of 70° F. The table below shows the increase in viscosity over the 40 day period.

| Weight Percent Hardstock | Hardstock Type [1] | Crystal Phase of Shortening | Increase in Viscosity, 40 days at 100° F. |
|---|---|---|---|
| 30 | Soybean oil | Beta | 1 |
| 35 | do | do | 1 |
| 45 | do | do | 4 |
| 30 | Rapeseed oil | Beta-prime | 14 |
| 35 | Cottonseed oil | do | 13 |

[1] Substantially completely hydrogenated oils having iodine values of 8. The beta-prime shortenings were tempered at about 80° to 85°F., whereas the beta-phase shortenings were tempered at about 120° F.

The increase in viscosity shown in the above table is a measure of the amount of firming which the icing underwent during the storage period. The icings prepared from the beta-prime phase shortenings underwent substantial firming during the storage period and did not have the soft spreadable texture of the icings made with beta-phase shortenings. The icings which contained the beta-phase shortenings had excellent eating qualities and were stable toward slump and bleeding of oil when spread on a cake.

When other beta-phase-tending hardstocks such as tristearin, tripalmitin, and symmetrical palmitodistearin are substituted for the substantially completely hydrogenated soybean oil in the above examples, non-firming, storage-stable icings are obtained. Other base stocks, such as partially hydrogenated cottonseed oil having an iodine value of about 100 and a solids content index of about 0 to 3 at 70° F. and partially hydrogenated corn oil having an iodine value of about 60 and a solids content index of about 55 at 60° F., can be substituted for the partially hydrogenated soybean oil base stock in the above examples with substantially equal results.

What is claimed is:

1. A substantially non-firming and non-hardening storage-stable icing comprising a mixture of sugar, water, and shortening, said shortening comprising essentially, by weight of the shortening, from about 55% to about 75% partially hydrogenated glyceride base stock having an iodine value of from about 50 to about 110 and from about 25% to about 45% substantially completely hydrogenated triglyceride hardstock having an iodine value not exceeding about 12, at least about 70% of the shortening solids being in a beta-phase.

2. The icing of claim 1 in which the base stock is partially hydrogenated soybean oil having an iodine value of from about 75 to about 95.

3. The icing of claim 1 in which the hardstock is substantially completed hydrogenated soybean oil.

4. A substantially non-firming and non-hardening storage-stable icing comprising a mixture of sugar, water, and shortening, said shortening comprising essentially, by weight of the shortening, from about 55% to about 75% partially hydrogenated soybean oil base stock having an iodine value of from about 75 to about 95 and from about 25% to about 45% substantially completely hydrogenated soybean oil hardstock having an iodine value not exceeding about 12, at least about 70% of the shortening solids being in a beta-phase.

5. A substantially non-firming and non-hardening storage-stable icing comprising, by weight of the icing, from about 45% to about 75% sugar, from about 10% to about 25% water, and from about 5% to about 30% shortening, said shortening comprising essentially, by weight of the shortening, from about 55% to about 75% partially hydrogenated glyceride base stock having an iodine value of from about 50 to about 110 and from about 25% to about 45% substantially completely hydrogenated triglyceride hardstock having an iodine value not exceeding about 12, at least about 70% of the shortening solids being in a beta-phase.

6. A substantially non-firming and non-hardening storage-stable icing comprising, by weight of the icing, from about 45% to about 75% sugar, from about 10% to about 25% water, and from about 5% to about 30% shortening, said shortening comprising essentially by weight of the shortening, from about 55% to about 75% partially hydrogenated soybean oil base stock having an iodine value of from about 75 to about 95 and from about 25% to about 45% substantially completely hydrogenated soybean oil hardstock having an iodine value not exceeding about 12, at least about 70% of the shortening solids being a beta-phase.

7. A plastic shortening adapted to serve as a shortening component of a substantially non-firming and non-hardening storage-stable icing comprising sugar, water, and shortening, said shortening comprising essentially from about 55% to about 75% by weight partially hydrogenated glyceride base stock having an iodine value of from about 50 to about 110 and from about 25% to about 45% by weight substantially completely hydrogenated triglyceride hardstock having an iodine value not exceeding about 12, at least about 70% of the shortening solids being in a beta-phase.

8. The shortening of claim 7 in which the base stock is partially hydrogenated soybean oil having an iodine value of from about 75 to about 95.

9. The shortening of claim 7 in which the hardstock is substantially completely hydrogenated soybean oil.

10. A plastic shortening adapted to serve as a shortening component of a substantially non-firming and non-hardening storage-stable icing comprising sugar, water, and shortening, said shortening comprising essentially from about 55% to about 75% by weight partially hydrogenated soybean oil base stock having an iodine value of from about 75 to about 95 and from about 25% to about 45% by weight substantially completely hydrogenated soybean oil hardstock, at least about 70% of the shortening solids being in a beta-phase.

11. A process of preparing a substantially non-firming and non-hardening storage-stable icing comprising sugar, water, and shortening which method comprises: forming a fluid uniform mixture, by weight of the shortening, of from about 55% to about 75% partially hydrogenated glyceride base stock having an iodine value of from about 50 to about 110 and from about 25% to about 45% substantially completely hydrogenated triglyceride hardstock having an iodine value not exceeding about 12 and a beta-phase-pending structure; chilling said mixture to a temperature below the solidification point of the hardstock component; converting the solid phase of the mixture at least to a beta-phase to such an extent that at least about 70% of the total crystals in the shortening are beta-phase crystals; and substantially uniformly blending said shortening with the non-shortening ingredients.

References Cited by the Examiner

UNITED STATES PATENTS

| | | | |
|---|---|---|---|
| 2,598,282 | 5/1952 | Melnick | 99—139 |
| 2,801,177 | 7/1957 | Lutton | 99—119 |
| 3,102,814 | 9/1963 | Thompson | 99—118 |
| 3,132,951 | 5/1964 | Thompson | 99—118 |

FOREIGN PATENTS 810,278   3/1959   Great Britain.

OTHER REFERENCES

Shepherd: "Aerosols: Science and Technology," 1961, Interscience Publishers, Inc., New York, pp. 421, 425.

A. LOUIS MONACELL, *Primary Examiner.*

J. M. GOLIAN, *Assistant Examiner.*